(12) United States Patent
Inoue et al.

(10) Patent No.: US 8,355,851 B2
(45) Date of Patent: Jan. 15, 2013

(54) VEHICLE CRUISE CONTROL APPARATUS AND VEHICLE CRUISE CONTROL METHOD

(75) Inventors: Gen Inoue, Susono (JP); Katsuyuki Kawai, Toyota (JP); Hiroyuki Sawada, OKazaki (JP); Ichiro Kitaori, Nagoya (JP); Yasuhito Ishida, Toyokawa (JP)

(73) Assignees: Toyota Jidosha Kabushiki Kaisha, Toyota (JP); Advics Co., Ltd., Kariya (JP)

( * ) Notice: Subject to any disclaimer, the term of this patent is extended or adjusted under 35 U.S.C. 154(b) by 823 days.

(21) Appl. No.: 12/230,747

(22) Filed: Sep. 4, 2008

(65) Prior Publication Data
US 2009/0076701 A1 Mar. 19, 2009

(30) Foreign Application Priority Data
Sep. 6, 2007 (JP) ................. 2007-232069

(51) Int. Cl.
- *B60T 8/32* (2006.01)
- *B60T 8/24* (2006.01)
- *B60T 7/12* (2006.01)
- *B60T 8/88* (2006.01)
- *B60Q 1/00* (2006.01)

(52) U.S. Cl. ............... 701/93; 701/94; 701/95; 701/96; 701/97; 303/122; 340/453

(58) Field of Classification Search ............. 701/93–97; 303/122; 340/453
See application file for complete search history.

(56) References Cited

U.S. PATENT DOCUMENTS

| | | | |
|---|---|---|---|
| 5,749,427 A * | 5/1998 | Satonaka et al. | 180/179 |
| 2002/0138190 A1* | 9/2002 | Hellmann et al. | 701/78 |
| 2003/0033073 A1* | 2/2003 | Kichima et al. | 701/96 |
| 2004/0168843 A1* | 9/2004 | Lankes et al. | 180/178 |
| 2005/0261107 A1* | 11/2005 | Lankes et al. | 477/34 |
| 2006/0095195 A1* | 5/2006 | Nishimura et al. | 701/96 |
| 2006/0131094 A1* | 6/2006 | Lankes et al. | 180/338 |
| 2006/0241844 A1* | 10/2006 | Mori et al. | 701/93 |
| 2007/0142994 A1* | 6/2007 | Boecker et al. | 701/93 |

FOREIGN PATENT DOCUMENTS

| | | |
|---|---|---|
| JP | A-07-137560 | 5/1995 |
| JP | A-10-172098 | 6/1998 |
| JP | A-2000-006691 | 1/2000 |
| JP | A-2003-237409 | 8/2003 |
| JP | A-2003-320872 | 11/2003 |
| JP | A-2004-90679 | 3/2004 |
| JP | A-2005-096508 | 4/2005 |
| JP | A-2005-282453 | 10/2005 |

OTHER PUBLICATIONS

U.S. Appl. No. 12/223,579, filed Aug. 4, 2008 in the name of Gen Inoue et al.

(Continued)

*Primary Examiner* — James Trammell
*Assistant Examiner* — Majdi Alsomiri
(74) *Attorney, Agent, or Firm* — Oliff & Berridge, PLC

(57) ABSTRACT

A vehicle cruise control apparatus includes a vehicle speed adjusting device that adjusts a vehicle speed to a set target vehicle speed, a brake operation detecting device that detects brake operation performed by a driver, and a first controller that controls the vehicle speed adjusting device based on a target driving force that maintains a vehicle in a stopped condition, when the brake operation performed by the driver is detected.

13 Claims, 4 Drawing Sheets

OTHER PUBLICATIONS

Office Action issued on Dec. 20, 2011 in Japanese Patent Application No. 2007-232069. (with English language translation).

Japanese Office Action dated May 25, 2012 in Japanese Patent Application No. 2007-232069 (with translation).

Japanese Office Action drafted Mar. 9, 2012 in Japanese Patent Application No. 2007-232069 (with partial translation).

* cited by examiner

VEHICLE CRUISE CONTROL APPARATUS AND VEHICLE CRUISE CONTROL METHOD

INCORPORATION BY REFERENCE

The disclosure of Japanese Patent Application No. 2007-232069 filed on Sep. 6, 2007 including the specification, drawings and abstract is incorporated herein by reference in its entirety.

BACKGROUND OF THE INVENTION

1. Field of the Invention

The invention relates to a vehicle cruise control apparatus, and more specifically relates to a vehicle cruise control apparatus and a vehicle cruise control method that do not stop an automatic cruise control when brake operation by a driver is detected.

2. Description of the Related Art

In order to lessen the burden on the driver of driving a vehicle, vehicles are equipped with a vehicle cruise control apparatus that performs an automatic cruise control, such as a cruise control which controls the vehicle at a fixed speed so that a vehicle speed is equal to a target vehicle speed, or a tracking cruise control which causes the vehicle to track the preceding vehicle, that is, an adaptive cruise control (ACC). The vehicle cruise control apparatus performs a coordinated control of an engine that provides a driving force to the vehicle and a brake device that provides a braking force to the vehicle in order to make the vehicle speed equal to the target vehicle speed. With the vehicle cruise control apparatus, a target driving force is calculated as a target controlled variable by an automatic cruise control ECU in order to make the vehicle speed equal to the target vehicle speed; the calculated target driving force is output to an engine ECU; and the engine ECU controls the engine, which is a vehicle speed adjusting device that adjusts the vehicle speed, based on the target driving force. Furthermore, with the vehicle cruise control apparatus, the target braking force is calculated as a target controlled variable by the automatic cruise control ECU in order to make the vehicle speed equal to the target vehicle speed; the calculated target braking force is output to the brake ECU; and the brake ECU controls the brake device, which is a vehicle speed adjusting device that adjusts the vehicle speed, based on the target braking force. The vehicle cruise control apparatus according to related technology stops the automatic cruise control when drive operation is performed by the driver.

Related technology has been proposed that does not cause the vehicle cruise control apparatus to stop the automatic cruise control even when brake operation is performed by the driver. For example, technology is proposed in Japanese Patent Application Publication No. 2004-90679 (JP-A-2004-90679) that does not stop the automatic cruise control even when brake operation is performed by the driver. In the technology, the automatic cruise control ECU reduces the target vehicle speed, and calculates the target driving force so that the vehicle speed becomes equal to the reduced target vehicle speed. The engine ECU controls the engine based on the target driving force calculated by the automatic cruise control ECU, thereby reducing the vehicle speed.

There has been demand in recent years to perform the automatic cruise control at a low vehicle speed, for example, at approximately 10 km/h. With a vehicle cruise control apparatus according to related technology, the automatic cruise control is stopped when the driver performs brake operation while the vehicle is moving at a low vehicle speed on a slope under the automatic cruise control. When the automatic cruise control is stopped while the vehicle is moving at a low speed on a slope, there is a possibility that the position of the vehicle may not be maintained, and thus, the behavior of the vehicle may change, for example, the vehicle may roll back down on an upward slope, if the vehicle cannot be maintained in a stopped condition on the slope by the braking force produced by the brake operation performed by the driver.

SUMMARY OF THE INVENTION

The invention provides a vehicle cruise control apparatus and a vehicle cruise control method that maintain a vehicle in a stopped condition, when brake operation is performed by a driver.

A first aspect of the invention relates to a vehicle cruise control apparatus. The vehicle cruise control apparatus includes a vehicle speed adjusting device that adjusts a vehicle speed to a set target vehicle speed, a brake operation detecting device that detects brake operation performed by a driver and a first controller that controls the vehicle speed adjusting device based on a target driving force that maintains a vehicle in a stopped condition, when the brake operation performed by the driver is detected.

Furthermore, the vehicle cruise control apparatus according to this aspect may also include an inclination detecting device that detects an inclination of a road surface on which the vehicle is traveling, and a vehicle speed detecting device that detects the vehicle speed. In addition, the first controller may calculate a driving force that makes the detected vehicle speed equal to the target vehicle speed, and the target driving force may include an inclination target driving force that maintains the vehicle in a stopped condition at the detected inclination, and a feedback target driving force determined by subtracting the inclination target driving force from the calculated driving force.

Furthermore, in the vehicle cruise control apparatus according to this aspect, the first controller may calculate that the feedback target driving force is 0 or less, when the brake operation detecting device detects the brake operation.

Furthermore, in the vehicle cruise control apparatus according to this aspect, when the brake operation detecting device detects the brake operation, the first controller may calculate the feedback target driving force so that the feedback target driving force decreases from 0 over time until the detected vehicle speed is 0.

In the vehicle cruise control apparatus according to this aspect, the first controller may calculate that the feedback target driving force is 0, when the brake operation detecting device detects the brake operation.

Furthermore, the vehicle cruise control apparatus according to this aspect may also include a second controller that controls the vehicle speed adjusting device. The first controller may calculate the inclination target driving force and the feedback target driving force, and output at least one of the inclination target driving force and the feedback target driving force to the second controller; and the second controller may stop controlling the vehicle speed adjusting device based on the target driving force, when the feedback target driving force calculated by the first controller exceeds 0.

In the vehicle cruise control apparatus according to this aspect, the first controller may calculate the inclination target driving force based on the detected inclination.

The vehicle cruise control apparatus according to this aspect may also include a brake operation amount detecting device that detects an amount of the brake operation performed by the driver, and the first controller may calculate the inclination target driving force based on the detected inclination and the detected amount of the brake operation.

In the vehicle cruise control apparatus according to this aspect, the inclination target driving force calculated when the detected inclination is a positive value may be larger than the inclination target driving force calculated when the detected inclination is 0 or less.

A second aspect of the invention relates to a vehicle cruise control method. The vehicle cruise control method includes detecting brake operation performed by a driver, calculating a target driving force that maintains a vehicle in a stopped condition, when the brake operation performed by the driver is detected, and providing the calculated target driving force to the vehicle.

The vehicle cruise control method according to this aspect may also include detecting an inclination of a road surface on which the vehicle is traveling, and calculating the target driving force based on the detected inclination.

The vehicle cruise control method according to this aspect may also include detecting an amount of the brake operation performed by the driver, and calculating the target driving force based on the detected amount of the brake operation and the detected inclination.

The vehicle cruise control method according to this aspect may also include calculating the target driving force so that the target driving force decreases as the vehicle speed approaches 0, when brake operation is detected.

The vehicle cruise control method according to this aspect may be performed periodically.

The vehicle cruise control apparatus according to the invention provides the effect of maintaining the vehicle in a stopped condition when the brake operation is performed by the driver.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EMBODIMENTS

An embodiment of the invention will be described below in detail with reference to the drawings. Note, the invention is not restricted by the following embodiment. Furthermore, the component elements in the following embodiment include elements which can easily be conceived by one skilled in the art or elements which are essentially the same.

Figure 1:
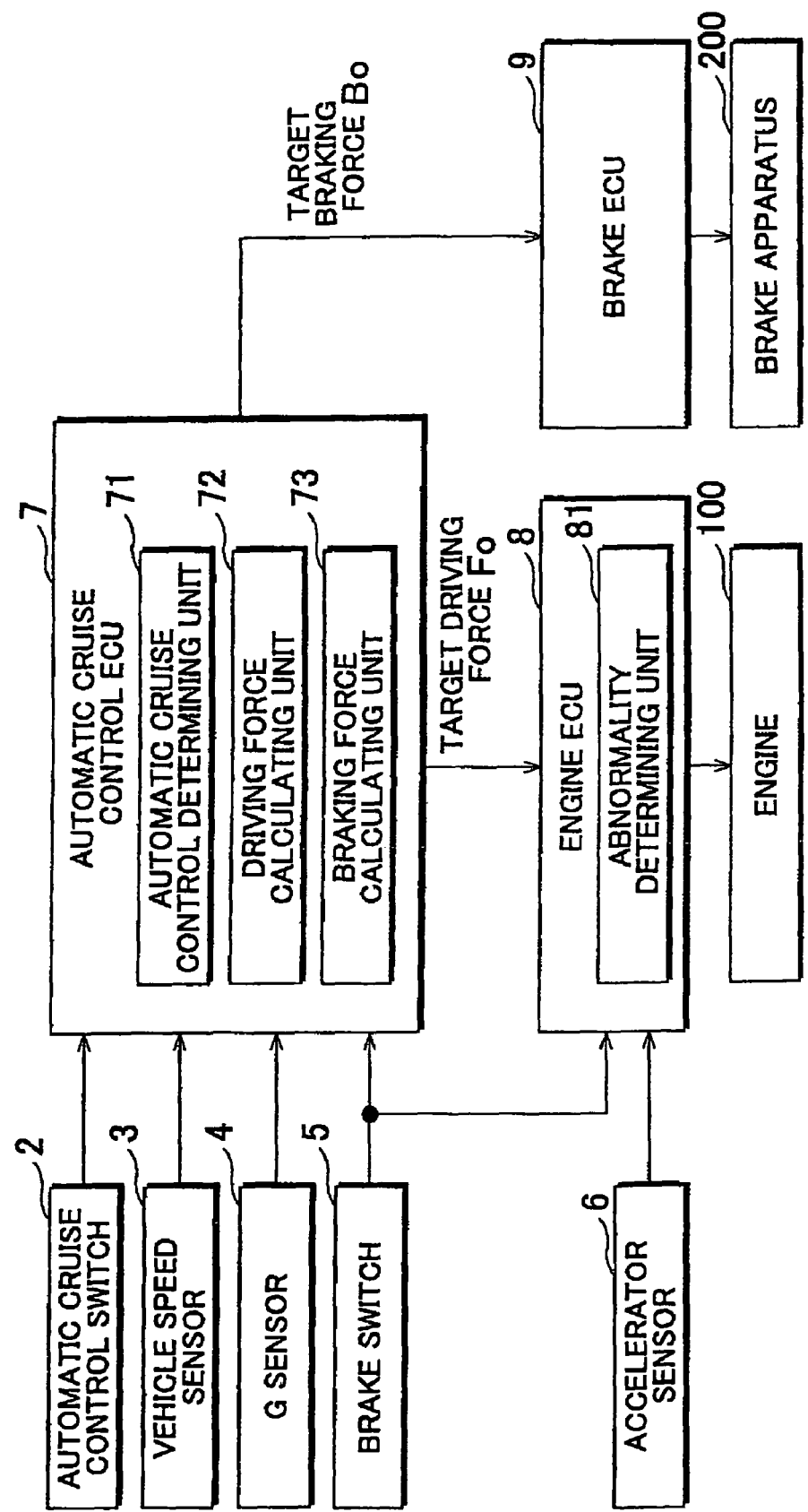
FIG. 1 is a diagram showing an example of the configuration of a vehicle cruise control apparatus according to an embodiment of the invention.

FIG. 1 is a diagram showing an example of the configuration of a vehicle cruise control apparatus according to an embodiment of the invention. As shown in FIG. 1, a vehicle cruise control apparatus 1 is mounted in a vehicle not shown in the drawings and performs an automatic cruise control in order to make a vehicle speed equal to a target vehicle speed. The vehicle cruise control apparatus 1 includes an automatic cruise control switch 2, a vehicle speed sensor 3, a G sensor 4, a brake switch 5, an accelerator sensor 6, an automatic cruise control ECU 7, an engine ECU 8, and a brake ECU 9. Note, the engine 100 is an example of a vehicle speed adjusting device that adjusts a vehicle speed, is controlled by the engine ECU 8 based on a target driving force calculated by the automatic cruise control ECU 7, and provides a driving force to the vehicle. Furthermore, a brake device 200 is controlled by the brake ECU 9 based on a target braking force determined by the automatic cruise control ECU 7 and applies a braking force to the vehicle. The brake device 200 generates a braking force based on brake operation performed by the driver, in other words, on the depression operation of the brake pedal (not shown) performed by the driver.

The automatic cruise control switch 2 is a control start trigger. The automatic cruise control switch 2 is mounted inside the cabin of the vehicle (not shown) and is turned ON by the driver. The automatic cruise control switch 2 is connected to the automatic cruise control ECU 7, and outputs an ON signal to the automatic cruise control ECU 7 when turned ON by the driver. Thus, the automatic cruise control switch 2 is the control start trigger for making the automatic cruise control ECU 7 start the automatic cruise control.

The vehicle speed sensor 3 detects the vehicle speed V. The vehicle speed sensor 3 is connected to the automatic cruise control ECU 7 and outputs the detected vehicle speed V to the automatic cruise control ECU 7. In this case, the vehicle speed sensor 3 is, for example, a wheel speed sensor provided on each of the vehicle wheels (not shown). In this case, the automatic cruise control ECU 7 calculates the vehicle speed V based on the speeds of the vehicle wheels determined by the wheel speed sensors, which are vehicle speed sensors 3 provided on the vehicle wheels.

The G sensor 4 is an example of an inclination detecting device. The G sensor 4 detects the inclination of the vehicle. In other words, the G sensor 4 detects the inclination θ of a road surface on which the vehicle is currently traveling. The G sensor 4 is connected to the automatic cruise control ECU 7 and outputs the detected inclination θ to the automatic cruise control ECU 7. In this case, the inclination θ is a positive value if the vehicle is traveling on a road surface that is inclined upward and is a negative value if traveling on a road surface that is inclined downward.

The brake switch 5 is an example of a brake operation detecting device. The brake switch 5 detects brake operation performed by the driver. The brake switch 5 is turned ON when the brake pedal provided in the cabin of the vehicle is depressed by the driver. The brake switch 5 is connected to the automatic cruise control ECU 7 and the engine ECU 8, and outputs an ON signal to the automatic cruise control ECU 7 and the engine ECU 8 when turned ON by the driver depressing the brake pedal. Thus, information as to whether or not brake operation is performed by the driver is output to the automatic cruise control ECU 7 and the engine ECU 8.

The accelerator sensor 6 is an example of an accelerator operation amount detecting apparatus. The accelerator sensor 6 detects an amount S of accelerator operation performed by the driver (hereinafter, may be referred to as "accelerator operation amount S). The accelerator sensor 6 detects the amount by which the accelerator pedal provided in the cabin of the vehicle is depressed by the driver, as the accelerator operation amount S. The accelerator sensor 6 is connected to the engine ECU 8 and outputs the amount S of the accelerator operation performed by the driver, to the engine ECU 8.

The automatic cruise control ECU 7 is an example of a first controller. The automatic cruise control ECU 7 calculates a target driving force so that the vehicle speed V becomes equal to a preset target vehicle speed Vo, and outputs the calculated target driving force to the engine ECU 8. In this embodiment, the automatic cruise control ECU 7 calculates an inclination target driving force Foi and a feedback target driving force Fof, and outputs the calculated inclination target driving force Foi and the calculated feedback target driving force Fof to the engine ECU 8. Furthermore, the automatic cruise control ECU 7 calculates a target braking force Bo so that the vehicle speed V becomes equal to the preset target vehicle speed Vo, and outputs the calculated target braking force Bo to the brake ECU 9. In this case, the target vehicle speed Vo is a value at which the vehicle travels at low speed, such as approximately 10 km/h.

The automatic cruise control ECU 7 controls the engine 100 using the engine ECU 8 based on the target driving force Fo which is the sum of the inclination target driving force Foi and the feedback target driving force Fof, and controls the brake device 200 using the brake ECU 9 based on the target braking force Bo. In other words, the automatic cruise control ECU 7 performs a coordinated control of the engine 100 and the brake device 200 so that the vehicle speed V becomes equal to the preset target vehicle speed Vo. The automatic cruise control ECU 7 includes an automatic cruise control determining unit 71, a driving force calculating unit 72, and a braking force calculating unit 73. In this case, the hardware construction of the automatic cruise control ECU 7 is already common knowledge, and therefore the description thereof is omitted.

The automatic cruise control determining unit 71 determines whether the driver intends to start the automatic cruise control. The automatic cruise control determining unit 71 determines whether or not to start the automatic cruise control based on whether or not an ON signal has been output by the automatic cruise control switch 2 being turned ON by the driver.

The driving force calculating unit 72 calculates the target driving force Fo to be output by the engine 100. The driving force calculating unit 72 calculates the target driving force Fo so that the vehicle speed V becomes equal to the preset target vehicle speed Vo. In this embodiment, the driving force calculating unit 72 calculates the inclination target driving force Foi that maintains the vehicle in a stopped condition at an inclination θ detected by the G sensor 4, and calculates the feedback target driving force Fof determined by subtracting the inclination target driving force Foi from the target driving force Fo calculated so that the vehicle speed V detected by the vehicle speed sensor 3 becomes equal to the target vehicle speed Vo. In this case, the inclination target driving force Foi is calculated based on the preset specifications of the vehicle and the inclination θ which is detected by the G sensor 4, and output to the automatic cruise control ECU 7. When an upward inclination (+θ) is detected, the inclination target driving force Foi is a driving force provided by the engine 100 to the vehicle in order to prevent the vehicle from rolling back down at the detected inclination +θ when the vehicle is stopped, and the inclination target driving force Foi is a positive value. When a downward inclination (−θ) is detected, the inclination target driving force Foi is the negative value of the inclination target driving force Foi calculated at an upward inclination whose absolute value is the same as the absolute value of the detected downward inclination. In addition, when a downward inclination (−θ) is detected, the inclination target driving force Foi may also be calculated by subtracting the braking force applied by the brake device 200 to the vehicle according to the amount of brake operation (for example, the depressing force of the driver on the brake pedal, the stroke of the brake pedal, the pressure in the master cylinder, and the like) detected by a brake operation amount detecting device (not shown) that detects the amount of brake operation performed by the driver, from the above-described negative value of the inclination target driving force Foi calculated at an upward inclination whose absolute value is the same as the absolute value of the detected downward inclination.

Furthermore, in this embodiment, when the brake switch 5 is turned ON and outputs an ON signal, that is, when brake operation performed by the driver is detected, the driving force calculating unit 72 calculates the target driving force Fo that maintains the vehicle in a stopped condition in order to reduce the vehicle speed V, and outputs the detected target driving force Fo to the engine ECU 8. In this embodiment, the driving force calculating unit 72 calculates that the feedback target driving force Fof is 0 or less, when brake operation performed by the driver is detected. In other words, the target driving force Fo, which is the sum of the inclination target driving force Foi and the feedback target driving force Fof, is less than or equal to the inclination target driving force Foi that maintains the vehicle in a stopped condition at the inclination θ detected by the G sensor 4.

In this case, the driving force calculating unit 72 calculates that the feedback target driving force Fof is 0 immediately after brake operation performed by the driver is detected. After calculating that the feedback target driving force Fof is 0, the driving force calculating unit 72 calculates the feedback target driving force Fof so that the feedback target driving force Fof decreases over time from 0 until the detected vehicle speed V becomes 0. In other words, if the detected vehicle speed V is not 0 after brake operation performed by the driver has been detected, the driving force calculating unit 72 calculates that the target driving force Fo is less than the inclination target driving force Foi. When an upward inclination (+θ) is detected, the inclination target driving force Foi is preferably calculated so that the absolute value of the target driving force Foi is slightly larger than the absolute value of the target driving force Foi calculated at a downward inclination whose absolute value is the same as the absolute value of the detected upward inclination, in order to reliably prevent the vehicle from rolling back down. In this case, if the feedback target driving force Fof is set to 0 and the target driving force Fo is equal to the inclination target driving force Foi, the vehicle speed V is not 0. Thus, as described above, if the target driving force Fo is less than the inclination target driving force Foi, the vehicle speed V is 0. Therefore, the vehicle can reliably be maintained in a stopped condition by the engine ECU 8 controlling the engine 100 based on the target driving force Fo, without the driver further depressing on the brake pedal in order to stop the vehicle.

The braking force calculating unit 73 calculates the target braking force Bo to be output by the brake device 200. The braking force calculating unit 73 calculates the target braking force Bo so that the vehicle speed V becomes equal to the preset target vehicle speed Vo. The braking force calculating unit 73 outputs the target braking force Bo calculated so that the vehicle speed V becomes equal to the target vehicle speed Vo, to the brake ECU 9, when the brake switch 5 is OFF and an ON signal is not output. In contrast, the braking force calculating unit 73 does not output the target braking force Bo calculated so that the vehicle speed V becomes equal to the target vehicle speed Vo, to the brake ECU 9, when the brake switch 5 is ON and an ON signal is output, that is, when brake operation by the driver is detected.

The engine ECU 8 is an example of a second controller. The engine ECU 8 controls the engine 100 based on the target driving force Fo. The engine ECU 8 is connected to the automatic cruise control ECU 7 and controls the engine 100 based on the target driving force Fo which is the sum of the inclination target driving force Foi and the feedback target driving force Fof calculated and output by the automatic cruise control ECU7. The engine ECU8 has an abnormality determining unit 81.

The abnormality determining unit 81 determines whether or not the target controlled variable, that is, the target driving force Fo from the automatic cruise control ECU 7 is an abnormal value. The abnormality determining unit 81 determines whether or not the feedback target driving force Fof calculated by the automatic cruise control ECU 7 satisfies an abnormality determining condition set by the engine ECU 8 and, if the abnormality determining condition is satisfied, the abnormality determining unit 81 determines that the target driving force Fo from the automatic cruise control ECU 7 is an abnormal value. In this embodiment, the abnormality determining condition is whether or not the feedback target driving force Fof calculated by the automatic cruise control ECU 7 is less than or equal to 0 when the brake switch 5 is ON and an ON signal is output, that is, when brake operation performed by the driver is detected. In other words, the abnormality determining condition is whether or not the vehicle speed is decelerating when brake operation performed by the driver is detected.

When the engine ECU 8 determines that the automatic cruise control ECU 7 is malfunctioning, using the abnormality determining unit 81, the automatic cruise control is not performed based on the target driving force Fo which is the sum of the inclination target driving force Foi and the feedback target driving force Fof calculated by the automatic cruise control ECU 7 and output to the engine ECU 8, that is, the engine 100 is not operated based on the target driving force Fo. When the automatic cruise control is not performed based on the target driving force Fo, the engine ECU 8 controls the engine 100 based on the accelerator operation amount S detected by the accelerator sensor 6. In other words, when automatic cruise control is not performed based on the target driving force Fo, the engine ECU 8 stops the automatic cruise control and starts the normal control that controls the operation of the engine 100 based on the accelerator operation performed by the driver.

The brake ECU 9 controls the brake device 200 based on the target braking force Bo. The brake ECU 9 is connected to the automatic cruise control ECU 7 and controls the brake device 200 based on the target braking force Bo calculated and output by the automatic cruise control ECU 7.

Figure 2:
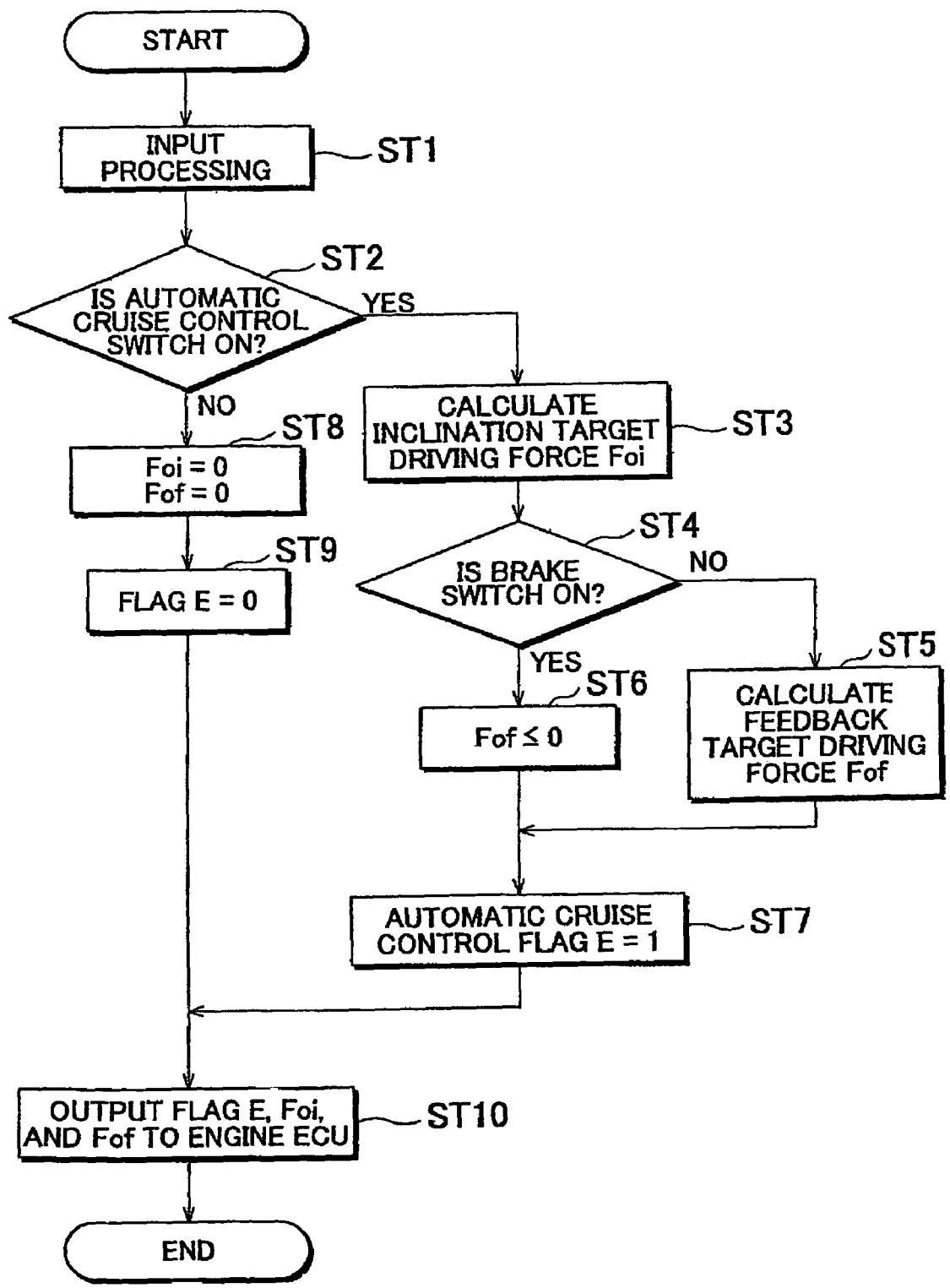
FIG. 2 is a diagram showing the operating flow of an automatic cruise control ECU of the vehicle cruise control apparatus according to the embodiment of the invention.
Figure 3:
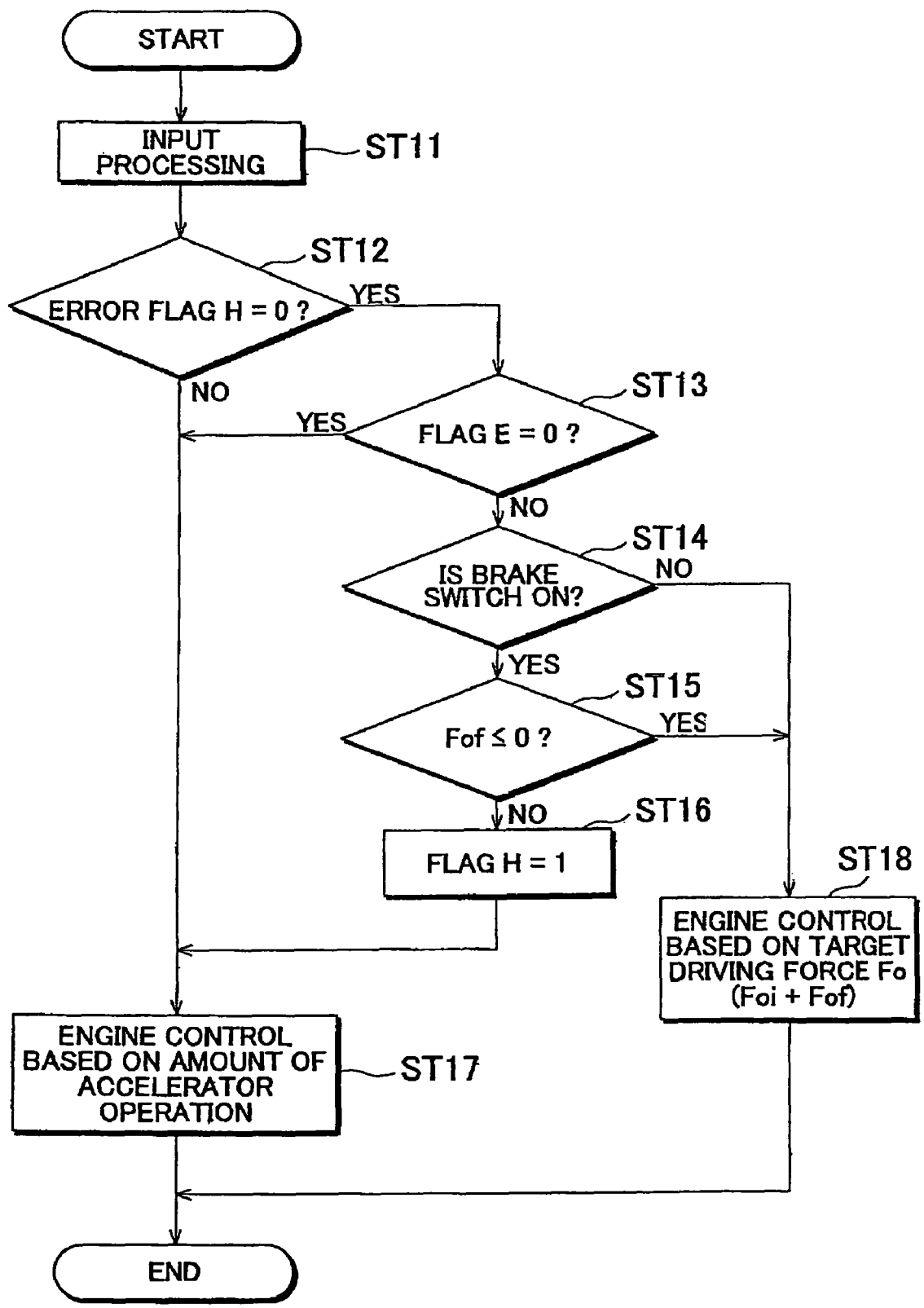
FIG. 3 is a diagram showing the operating flow of an engine ECU of the vehicle cruise control apparatus according to the embodiment of the invention.
Figure 4A:
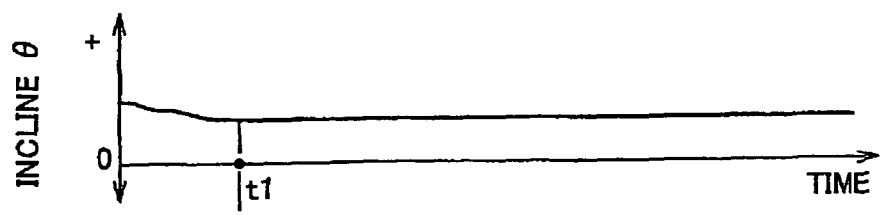
FIGS. 4A to 4E are diagrams for explaining the operation in automatic cruise control for an embodiment of the invention.
Figure 4B:
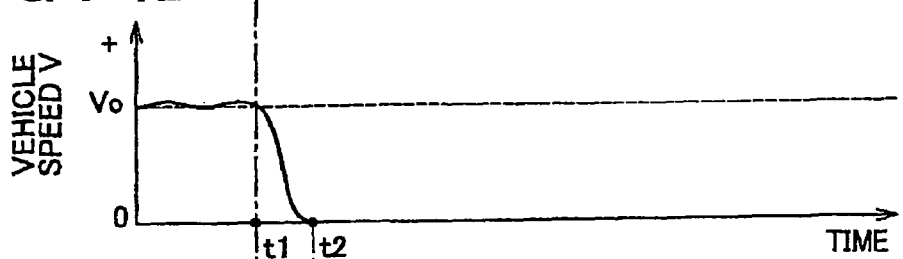
Figure 4C:
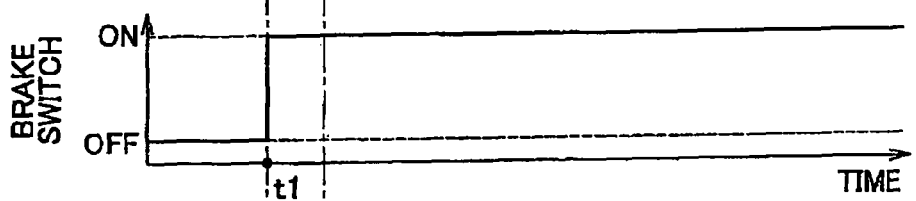
Figure 4D:
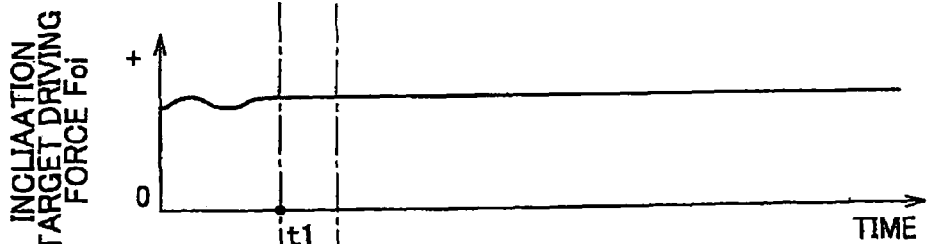
Figure 4E:
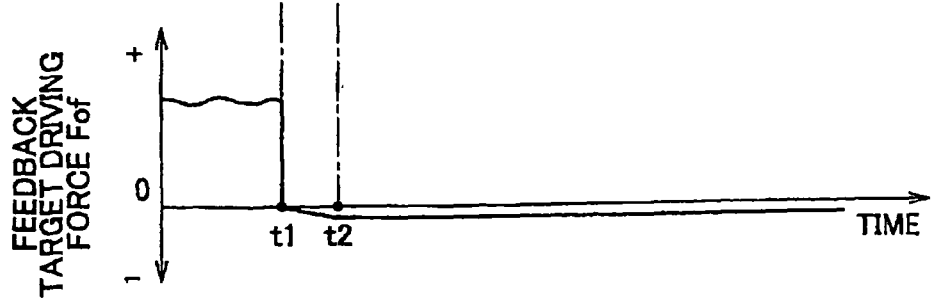

Next, the automatic cruise control using the vehicle cruise control apparatus 1 of the embodiment will be described. FIG. 2 is a diagram showing the operating flow of the automatic cruise control ECU of the vehicle cruise control apparatus according to the embodiment. FIG. 3 is a diagram showing the operating flow of the engine ECU of the vehicle cruise control apparatus according to the embodiment. FIGS. 4A to 4E are diagrams for explaining the operation in the automatic cruise control according to the embodiment. First, the relationship between the automatic cruise control ECU 7 and the engine ECU 8 in the automatic cruise control using the vehicle cruise control apparatus 1 will be described. Note, the automatic cruise control using the vehicle cruise control apparatus 1 is performed in each control cycle of the vehicle cruise control apparatus 1.

First, the operation of the automatic cruise control ECU 7 will be described. First, the automatic cruise control ECU 7 performs input processing as shown in FIG. 2 (step ST1). In this case, the automatic cruise control ECU 7 obtains the ON/OFF condition of the automatic cruise control switch 2, the vehicle speed V detected and output by the vehicle speed sensor 3, the inclination θ detected by the G sensor 4, and the ON/OFF condition of the brake switch 5.

Next, the automatic cruise control determining unit 71 of the automatic cruise control ECU 7 determines whether or not the automatic cruise control switch 2 is ON (step ST2). In this case, the automatic cruise control determining unit 71 determines that the driver intends to start the automatic cruise control, based on the ON/OFF condition of the automatic cruise control switch 2, which is obtained as described above.

Next, if the automatic cruise control switch 2 is determined to be ON (an affirmative determination is made in step ST2), the driving force calculating unit 72 of the automatic cruise control ECU 7 calculates the inclination target driving force Foi (step ST3). In this case, the driving force calculating unit 72 calculates the inclination target driving force Foi, based on the obtained inclination θ and the preset specifications of the vehicle (not shown). The inclination target driving force Foi is the driving force which is output by the engine 100 and provided to the vehicle, and which maintains the vehicle in a stopped condition at the current inclination θ.

Next, the driving force calculating unit 72 determines whether or not the brake switch 5 is ON (step ST4). In this case, the driving force calculating unit 72 determines whether or not brake operation performed by the driver is detected based on the ON/OFF condition of the brake switch 5, which is obtained as described above.

Next, if the brake switch 5 is determined to be OFF (a negative determination is made in step ST4), the driving force calculating unit 72 calculates the feedback target driving force Fof (step ST5). In this case, the driving force calculating unit 72 calculates the target driving force Fo so that the obtained vehicle speed V becomes equal to the target vehicle speed Vo, and calculates the feedback target driving force Fof by subtracting the calculated inclination target driving force Foi from the calculated target driving force.

If the brake switch 5 is determined to be ON (an affirmative determination is made in step ST4), the driving force calculating unit 72 calculates that the feedback target driving force Fof is 0 or less (step ST6). In this case, the driving force calculating unit 72 calculates that the feedback target driving force Fof is 0 or less, when brake operation performed by the driver is detected.

Next, the automatic cruise control ECU 7 sets an automatic cruise control flag E to 1 (step ST7). In this case, if the automatic cruise control switch 2 is determined to be ON (an affirmative determination is made in step ST2), the automatic cruise control ECU 7 determines that automatic cruise control has started, and sets the automatic cruise control flag E to 1.

If the automatic cruise control switch 2 is determined to be OFF (a negative determination is made in step ST2), the driving force calculating unit 72 calculates that the inclination target driving force Foi is 0, and the feedback target driving force Fof is 0 (step ST8). In this case, if the automatic cruise control is not being performed, that is, if the driver does not intend to start the automatic cruise control, the driving force calculating unit 72 calculates that the target driving force Fo is 0 so that the engine ECU 8 does not cause the engine 100 to output a driving force based on the target driving force Fo.

Next, the automatic cruise control ECU 7 sets the automatic cruise control flag E to 0 (step ST9). In this case, if the automatic cruise control switch 2 is determined to be OFF (a negative determination is made in step ST2), the automatic cruise control ECU 7 determines that automatic cruise control is not being performed and sets the automatic cruise control flag E to 0.

Next, the automatic cruise control ECU 7 outputs the condition of the automatic cruise control flag E, the calculated inclination target driving force Foi, and the feedback target driving force Fof to the engine ECU 8 (step ST10). In this case, if brake operation performed by the driver is not detected, the automatic cruise control ECU 7 outputs, to the engine ECU 8, the feedback target driving force Fof calculated by subtracting the calculated inclination target driving force Foi from the target driving force that makes the vehicle speed V equal to the target vehicle speed Vo. In other words, the automatic cruise control ECU 7 outputs, to the engine ECU 8, the target driving force Fo that makes the vehicle speed V equal to the target vehicle speed Vo. If brake operation performed by the driver is detected, the automatic cruise control ECU 7 outputs the feedback target driving force Fof calculated to be 0 or less, to the engine ECU 8. In other words, the automatic cruise control ECU 7 outputs, to the engine ECU 8, the target driving force Fo that reduces the vehicle speed V to 0 and maintains the vehicle in a stopped condition. If the automatic cruise control is not being performed, the automatic cruise control ECU 7 outputs, to the engine ECU 8, the inclination target driving force Foi that is 0, and the feedback target driving force Fof that is 0. Note, when the automatic cruise control ECU 7 outputs the condition of the automatic cruise control flag E, the calculated inclination target driving force Foi, and the calculated feedback target driving force Fof to the engine ECU 8, the current control cycle is completed and the next control cycle starts.

Next, the operation of the engine ECU 8 will be described. First, the engine ECU 8 performs input processing as shown in FIG. 3 (step ST11). In this case, the engine ECU 8 obtains the condition of the automatic cruise control flag E output from the automatic cruise control ECU 7 to the engine ECU 8, the inclination target driving force Foi, the feedback target driving force Fof, and the accelerator operation amount S detected by the accelerator sensor 6.

Next, the abnormality determining unit 81 of the engine ECU 8 determines whether or not a malfunction flag H is 0 (step ST12). In this case, the abnormality determining unit 81 determines whether or not the automatic cruise control ECU 7 is already malfunctioning, by determining whether or not the malfunction flag H is 0. The malfunction flag H is set to 1 if the automatic cruise control ECU 7 is malfunctioning.

Next, if it is determined that the malfunction flag H is 0 (an affirmative determination is made in step ST12), the abnormality determining unit 81 determines whether or not the automatic cruise control flag E is 0 (step ST13). In this case, if it is determined that the automatic cruise control ECU 7 is not malfunctioning, the abnormality determining unit 81 determines whether or not the automatic cruise control is being performed.

Next, if it is determined that the automatic cruise control flag E is not 0 (a negative determination is made in step ST13), the abnormality determining unit 81 determines whether or not the brake switch 5 is ON (step ST14). In this case, the abnormality determining unit 81 determines whether or not brake operation performed by the driver is detected, based on the ON/OFF condition of the brake switch 5, which is obtained as described above.

Next, if the brake switch 5 is determined to be ON (an affirmative determination is made in step ST14), the abnormality determining unit 81 determines whether or not the calculated feedback target driving force Fof is 0 or less (step ST15). In this case, the abnormality determining unit 81 determines whether or not the feedback target driving force Fof calculated by the automatic cruise control ECU 7 is 0 or less. In other words, if brake operation performed by the driver is detected, the engine ECU 8 determines whether or not the automatic cruise control ECU 7 has calculated the target driving force Fo that maintains the vehicle in a stopped condition. In this case, if the automatic cruise control ECU 7 is normally functioning, the feedback target driving force Fof is 0 or less. Therefore, if the automatic cruise control ECU 7 and the engine ECU 8 are normally functioning, the feedback target driving force Fof does not exceed 0. In other words, if brake operation performed by the driver is detected, the reason that the calculated inclination target driving force Foi exceeds 0 is that a malfunction has occurred.

Next, if it is determined that the calculated feedback target driving force Fof is 0 or less (an affirmative determination is made in step ST15), the engine ECU 8 controls the engine 100 based on the target driving force Fo, that is, the sum of the calculated inclination target driving force Foi and the feedback target driving force Fof (step ST18). In this case, when the calculated feedback target driving force Fof is 0 or less, the automatic cruise control ECU 7 is determined to be normally functioning, and the engine ECU 8 controls the engine 100 based on the inclination target driving force Foi and the feedback target driving force Fof calculated by the automatic cruise control ECU 7 that is normally functioning. If it is determined that the brake switch 5 is OFF (a negative determination is made in step ST14), the engine ECU 8 controls the engine 100 based on the target driving force Fo, that is, the sum of the calculated inclination target driving force Foi and the feedback target driving force Fof (step ST18).

If it is determined that the calculated feedback target driving force Fof exceeds 0 (a negative determination is made in step ST15) as shown in FIG. 3, the abnormality determining unit 81 sets the malfunction flag H to 1 (step ST16). In this case, the abnormality determining unit 81 determines that the automatic cruise control ECU 7 is malfunctioning, if the calculated feedback target driving force Fof exceeds 0.

Next, the engine ECU 8 controls the engine 100 based on the accelerator operation amount S (step ST17). In this case, if the abnormality determining unit 81 determines that the feedback target driving force Fof calculated by the automatic cruise control ECU 7 satisfies the abnormality determining condition, the engine ECU 8 stops controlling the engine 100 based on the calculated inclination target driving force Foi and the feedback target driving force Fof. In other words, the engine ECU 8 stops the automatic cruise control based on the calculated target driving force Fo. Note, the engine ECU 8 controls the engine 100 based on the accelerator operation amount S even if the malfunction flag H is determined to be 1 (a negative determination is made in step ST12). In other words, if it is already determined that the target driving force Fo from the automatic cruise control ECU 7 is an abnormal value, the engine ECU 8 does not perform the automatic cruise control based on the values of the target driving force Fo, which are sequentially calculated. If it is determined that the automatic cruise control flag E is 0 (an affirmative determination is made in step ST13), the engine ECU 8 controls the engine 100 based on the accelerator operation amount S. In other words, the engine 100 is controlled based on the accelerator operation of the driver, if the automatic cruise control is not performed.

Therefore, if brake operation performed by the driver is detected and the feedback target driving force Fof calculated by the automatic cruise control ECU 7 exceeds 0, the engine ECU 8 determines that the target driving force Fo from the automatic cruise control ECU 7 is an abnormal value, and does not control the engine 100 based on the calculated target driving force Fo. Therefore, it is possible to avoid controlling the engine 100 based on an abnormal target controlled variable due to, for example, a malfunction in the hardware configuration of the automatic cruise control ECU 7, such as the ROM or RAM, or communication noise or a communication failure between the automatic cruise control ECU 7 and engine ECU 8. In the first embodiment, if brake operation performed by the driver is detected during the automatic cruise control, the feedback target driving force Fof decreases, the vehicle speed V is reduced, and the vehicle is maintained in a stopped condition. Therefore, even if the feedback target driving force Fof that does not reduce the vehicle speed V is output to the engine ECU 8 because of a malfunction in the automatic cruise control ECU 7, it is possible to reduce the possibility that the vehicle speed V is not reduced and the vehicle is not maintained in a stopped condition when brake operation performed by the driver is detected.

As described above, as shown in FIGS. 4A to 4E, if brake operation performed by the driver is not detected, the vehicle cruise control apparatus 1 according to this embodiment performs the automatic cruise control based on the target driving force Fo which is the sum of the inclination target driving force Foi that enables the engine 100 to output the driving force that stops the vehicle at the detected inclination θ (upward inclination +θ in the FIGS. 4A to 4E), and the feedback target driving force Fof determined by subtracting the calculated inclination target driving force Foi from the target driving force that makes the vehicle speed V equal to the target vehicle speed Vo. Therefore, the vehicle speed V is made equal to the target vehicle speed Vo. If brake operation performed by the driver is detected (shown by t1 in FIG. 4C), the automatic cruise control is performed based on the target driving force Fo which is the sum of the feedback target driving force Fof which is 0, and the inclination target driving force Foi that enables the engine 100 to output the driving force that stops the vehicle at the detected inclination θ. In other words, the automatic cruise control is performed based on the target driving force Fo which is equal to the inclination target driving force Foi. Therefore, if brake operation performed by the driver is detected, the target driving force Fo is quickly reduced, and the vehicle speed V decelerates. In this case, if the vehicle speed V is not 0, the automatic cruise control ECU 7 continues to calculate the feedback target driving force Fof so that the feedback target driving force Fof gradually decreases from 0 over time, and thus, the automatic cruise control is performed based on the target driving force Fo which is less than the inclination target driving force Foi, and therefore, the vehicle speed V is further reduced, and the vehicle speed V reaches 0 (t2 shown in FIG. 4B). Thus, the vehicle is maintained in a stopped condition regardless of the inclination θ. In other words, the vehicle cruise control apparatus 1 does not stop the automatic cruise control when the brake operation is performed by the driver, and automatically maintains the vehicle in a stopped condition regardless of the amount of brake operation performed by the driver.

Even if a communication failure occurs between the automatic cruise control ECU 7 and the brake switch 5, or even if a malfunction occurs in the portion of the automatic cruise control ECU 7 that determines the ON/OFF condition of the brake switch 5, brake operation performed by the driver can be detected by the engine ECU 8, as long as the engine ECU 8 is normally functioning. Therefore, even if the feedback target driving force Fof is calculated to be larger than 0 by the malfunctioning automatic cruise control ECU 7 when brake operation is performed by the driver, the malfunction can be detected by the engine ECU 8. Furthermore, even if a communication failure occurs between the engine ECU 8 and the brake switch 5, or even if a malfunction occurs in the portion of the engine ECU 8 that determines the ON/OFF condition of the brake switch 5, brake operation by the driver can be detected by the automatic cruise control ECU 7, as long as the automatic cruise control ECU 7 is normally functioning. Therefore, even if the malfunctioning engine ECU 8 determines that brake operation is not performed by the driver when brake operation is actually performed by the driver, the automatic cruise control ECU 7 calculates that the feedback target driving force Fof is 0 or less. Therefore, if the output from the engine 100 increases and brake operation is performed by the driver, it is possible to avoid a situation where the vehicle speed V does not decelerate and the vehicle cannot be maintained in a stopped condition.

Note, although the inclination target driving force Foi and the feedback target driving force Fof are output from the automatic cruise control ECU 7 to the engine ECU 8 in the above-described embodiment, the invention is not restricted to the above-described embodiment. The inclination target driving force Foi and the target driving force Fo which is the sum of the inclination target driving force Foi and the feedback target driving force Fof may be output. Furthermore, the inclination target driving force Foi may be a positive value when the vehicle is traveling forward, and the inclination target driving force Foi may be a negative value when traveling in reverse.

Furthermore, in the above-described embodiment, the abnormality determining unit 81 of the engine ECU 8 may determine that the malfunction flag H is 1, that is, the automatic cruise control ECU 7 is malfunctioning, if the target driving force Fo calculated by the automatic cruise control ECU 7 continuously satisfies the abnormality determining condition for a fixed period of time.

Furthermore, although the automatic cruise control ECU 7 calculates the target driving force, and the engine ECU 8 controls the engine 100 based on the target driving force in the above-described embodiment, the automatic cruise control ECU 7 may calculate target driving torque, and the engine ECU 8 may control the engine 100 based on the target driving torque.

In the embodiment, the automatic cruise control ECU 7, the engine ECU 8, and the brake ECU 9 are separate ECUs. The three ECUs may have hardware configurations different from each other. Alternatively, one control device that has the functions of the automatic cruise control ECU 7, the engine ECU 8, and the brake ECU 9 may be configured.

As described above, the vehicle cruise control apparatus provided by the invention is useful as the vehicle cruise control apparatus that does not stop the automatic cruise control when brake operation performed by the driver is detected. In particular, the vehicle cruise control apparatus provided by the invention is suitable for maintaining the vehicle in a stopped condition when brake operation is performed by the driver.

What is claimed is:
1. A vehicle cruise control apparatus comprising:
   a vehicle speed adjusting device that adjusts a vehicle speed to a set target vehicle speed;
   a brake operation detecting device that detects that a brake pedal is depressed by a driver;
   an inclination detecting device that detects an inclination of a road surface on which the vehicle is traveling;
   a vehicle speed detecting device that detects the vehicle speed; and a first controller that calculates a target driving force so that the vehicle speed becomes equal to the set target vehicle speed and controls the vehicle speed adjusting device based on the target driving force, wherein if the brake pedal is depressed by the driver, the first controller controls the vehicle speed adjusting device based on a driving force that maintains the vehicle in a stopped condition as the target driving force, wherein the first controller calculates a driving force that makes the detected vehicle speed equal to the target vehicle speed; and the target driving force includes an inclination target driving force that maintains the vehicle in a stopped condition at the detected inclination, and a feedback target driving force determined by subtracting the inclination target driving force from the calculated driving force.

2. The vehicle cruise control apparatus according to claim 1, wherein the first controller calculates that the feedback target driving force is 0 or less, when the brake operation detecting device detects that the brake pedal is depressed by the driver.

3. The vehicle cruise control apparatus according to claim 2, wherein the first controller calculates the feedback target driving force so that the feedback target driving force decreases from 0 over time until the detected vehicle speed is 0, when the brake operation detecting device detects that the brake pedal is depressed by the driver.

4. The vehicle cruise control apparatus according to claim 2, wherein the first controller calculates that the feedback target driving force is 0, when the brake operation detecting device detects that the brake pedal is depressed by the driver.

5. The vehicle cruise control apparatus according to claim 2, further comprising
  a second controller that controls the vehicle speed adjusting device,
  wherein the first controller calculates the inclination target driving force and the feedback target driving force, and outputs at least one of the inclination target driving force and the feedback target driving force to the second controller, and
  the second controller stops controlling the vehicle speed adjusting device based on the target driving force, when the feedback target driving force calculated by the first controller exceeds 0.

6. The vehicle cruise control apparatus according to claim 1, wherein the first controller calculates the inclination target driving force based on the detected inclination.

7. The vehicle cruise control apparatus according to claim 6, further comprising
  a brake operation amount detecting device that detects an amount that the brake pedal is depressed by the driver, wherein the first controller calculates the inclination target driving force based on the detected amount that the brake pedal is depressed and the detected inclination.

8. The vehicle cruise control apparatus according to claim 1, wherein the inclination target driving force calculated when the detected inclination is a positive value is larger than the inclination target driving force calculated when the detected inclination is 0 or less.

9. A vehicle cruise control method, comprising:
  detecting that a brake pedal is depressed by a driver;
  detecting an inclination of a road surface on which the vehicle is traveling;
  calculating the target driving force based on the detected inclination;
  calculating a target driving force that maintains a vehicle in a stopped condition, if the brake pedal is depressed by the driver; and
  providing the calculated target driving force to the vehicle.

10. The vehicle cruise control method according to claim 9, further comprising:
  detecting an amount that the brake pedal is depressed by the driver; and
  calculating the target driving force based on the detected amount that the brake pedal is depressed and the detected inclination.

11. The vehicle cruise control method according to claim 9, further comprising:
  calculating the target driving force so that the target driving force decreases as the vehicle speed approaches 0, when the depressing of the brake pedal is detected.

12. The vehicle cruise control method according to claim 9, wherein the vehicle cruise control method is performed periodically.

13. A vehicle cruise control apparatus comprising:
  a vehicle speed adjusting device that adjusts a vehicle speed to a set target vehicle speed;
  an inclination detecting device that detects an inclination of a road surface on which the vehicle is traveling;
  brake operation detecting means for detecting that a brake pedal is depressed by a driver; and
  a first controller that calculates a target driving force so that the vehicle speed becomes equal to the set target vehicle speed and controls the vehicle speed adjusting device based on the target driving force, wherein if the brake pedal is depressed by the driver, the first controller controls the vehicle speed adjusting device based on a driving force that maintains the vehicle in a stopped condition as the target driving force, wherein the first controller calculates a driving force that makes the detected vehicle speed equal to the target vehicle speed; and the target driving force includes an inclination target driving force that maintains the vehicle in a stopped condition at the detected inclination, and a feedback target driving force determined by subtracting the inclination target driving force from the calculated driving force.

* * * * *